United States Patent [19]

Endo et al.

[11] Patent Number: 4,457,518
[45] Date of Patent: Jul. 3, 1984

[54] INFLATED SEAL FOR LARGE ANNULAR OPENINGS

[75] Inventors: Jerry K. Endo; Jeffrey P. Connell, both of Santa Clara, Calif.

[73] Assignee: Westinghouse Electric Corp., Pittsburgh, Pa.

[21] Appl. No.: 538,319

[22] Filed: Oct. 3, 1983

[51] Int. Cl.$^3$ ............................................. F16J 15/46
[52] U.S. Cl. ............................ 277/34.3; 277/212 C; 277/226
[58] Field of Search ................... 277/30, 31, 34, 34.3, 277/34.6, 226, 228–230, 212 FB, 212 R, 212 F, 212 C

[56] References Cited

U.S. PATENT DOCUMENTS

| | | | |
|---|---|---|---|
| 1,700,894 | 2/1929 | Joyce et al. | 277/212 C X |
| 1,942,366 | 1/1934 | Seamark | 277/34 X |
| 2,778,432 | 1/1957 | Allen | 277/34 X |
| 3,604,732 | 9/1971 | Malone | 277/34 X |
| 4,033,593 | 7/1977 | Molnar et al. | 277/212 F |
| 4,349,204 | 9/1982 | Malone | 277/34 |

Primary Examiner—Robert S. Ward, Jr.
Attorney, Agent, or Firm—F. J. Baehr, Jr.

[57] ABSTRACT

A seal for a large annular opening between two generally cylindrical surfaces. The seal being formed of a first portion having a base ring and a toroidal shaped arcuate portion extending from the central portion of the base ring, a lip portion extending radially inwardly and toward the high pressure portion from the end of the arcuate portion and a second portion having a base ring, both base rings being affixed to one of the cylindrical surfaces. The second base ring being disposed on the high pressure side of the first base ring and there being ribbons extending between the first portion and the second portion. The ribbons being made of a high strength material and being disposed on a predetermined pitch and attaching the free end of the first portion to the second portion to prevent the arcuate toroidal shaped portion from inverting, even though it is compliant and deforms substantially under pressure.

6 Claims, 3 Drawing Figures

INFLATED SEAL FOR LARGE ANNULAR OPENINGS

GOVERNMENT CONTRACT

The United States Government has rights in this invention pursuant to the terms and conditions of contract No. 0030-81-C-0105 between Westinghouse Electric Corporation and the Department of Defense.

BACKGROUND OF THE INVENTION

This invention relates to seals and more particularly to a seal for a large annular opening.

When sealing large annular openings, one of the problems is preventing the seal from inverting or flipping through when high pressures are being sealed. Another problem is keeping the cylindrical surfaces between which the seal is disposed concentric.

Elastomer seals for large annular openings are described in U.S. Pat. No. 4,033,593, and the following applications filed by the common assignee, one entitled "Large Annular Segmented Seal with Lock Portions", Ser. No. 451,585, filed Dec. 20, 1982, another Ser. No. 366,458, filed Apr. 8, 1982 and entitled "Segmented Annular Seal", and a third application entitled "Hoop Seal for a Large Annular Opening", Ser. No. 530,912, filed Sep. 9, 1983.

SUMMARY OF THE INVENTION

A seal for a large annular opening between two generally cylindrical surfaces, when made in accordance with this invention, comprises a first base portion affixed to one of the cylindrical surfaces, an arcuate toroidal portion extending from the first base portion in such a manner that a concave side thereof is disposed on the high pressure side of the seal, a second base portion affixed to the one cylinder on the high pressure side of the first base portion and ribbons formed from a high strength material spaced on a predetermined circumferential pitch between the toroidal portion and second base portion and embedded therein to form a compliant seal which will not invert and which has substantial self-centering characteristics.

BRIEF DESCRIPTION OF THE DRAWINGS

The objects and advantages of this invention will become more apparent from reading the following detailed description in conjunction with the accompanying drawings, in which.

DESCRIPTION OF THE PREFERRED EMBODIMENT

Figure 1:
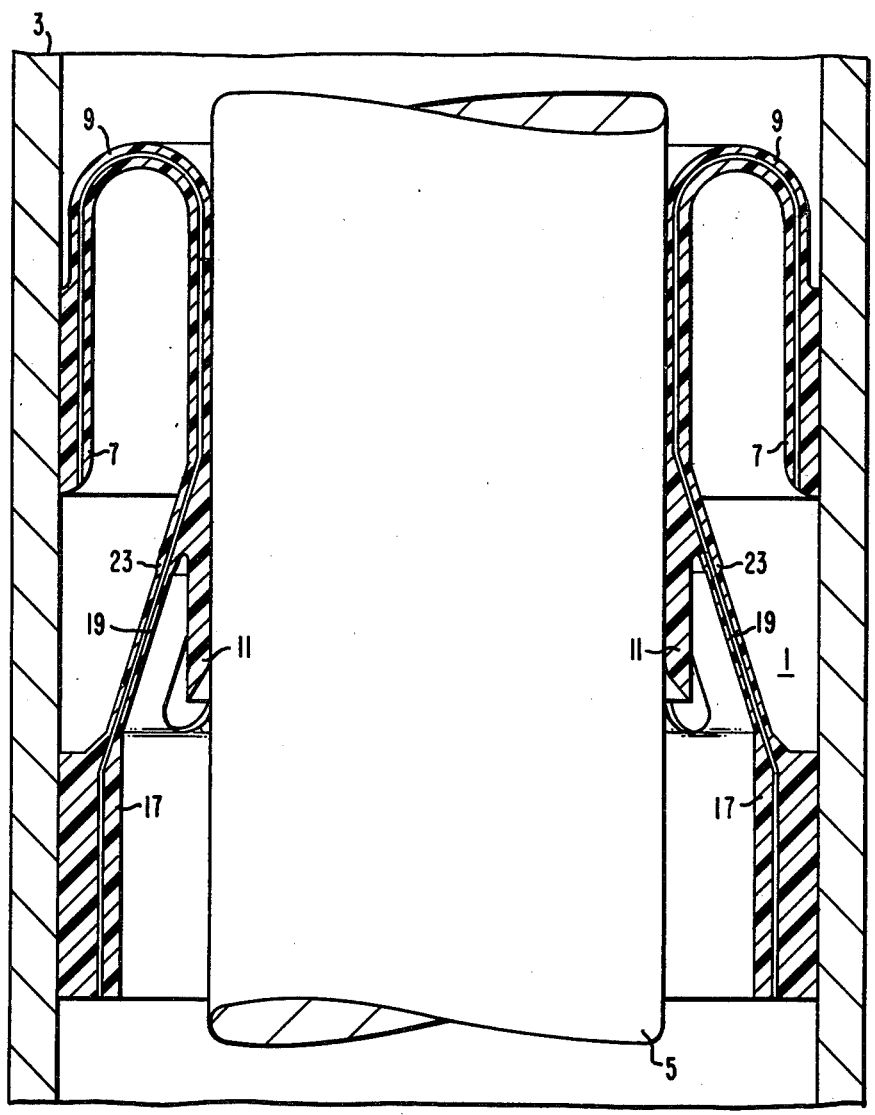
FIG. 1 is a sectional view of an annular seal made in accordance with this invention disposed between two concentric cylindrical surfaces.
Figure 2:
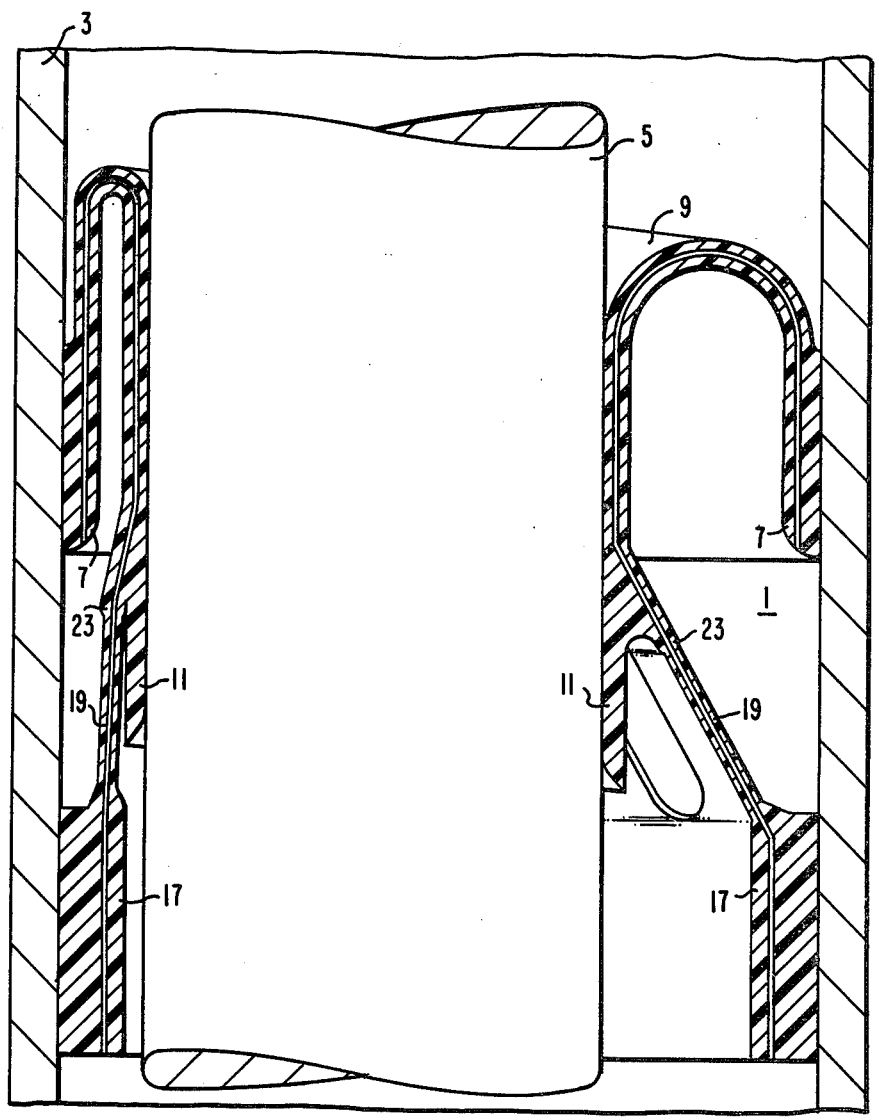
FIG. 2 is a sectional view of the seal disposed between eccentrically disposed cylindrical surfaces.
Figure 3:
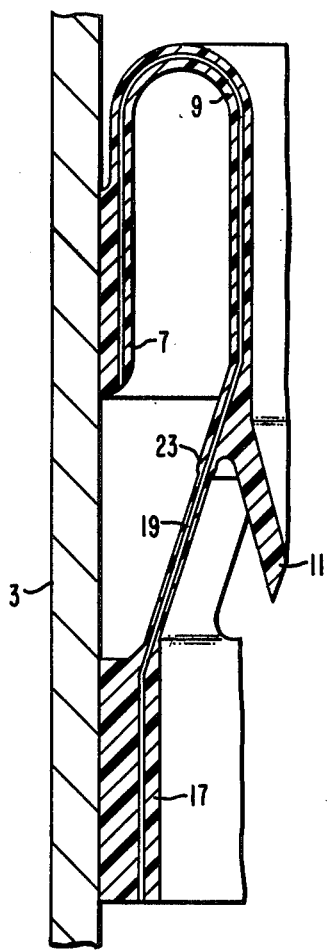
FIG. 3 is a partial section view of the seal in the free state.

Referring now to the drawings in detail and in particular to FIGS. 1, 2 and 3, there is shown a seal for a large annular opening between two generally cylindrical surfaces 3 and 5. The seal 1 comprises a first base portion 7 affixed to one of the cylindrical surfaces 3. Extending from the first base portion 7 is an arcuate portion 9 having a generally toroidal shape so disposed that a concave side thereof is on the high pressure side of the seal 1. Extending radially inwardly from the arcuate or toroidal shaped portion 9 and toward the high pressure side of the seal is a frusto conical portion 11 forming a lip which abuts the other cylindrical surface 5.

A second base portion 17 is also affixed to the cylindrical surface 3 forming a circumferential ring. Extending between the second base portion 17 and the arcuate toroidal shaped portion 9 are a plurality of ribbons 19 spaced on a predetermined circumferential pitch. The ribbons 19 are embedded in the arcuate toroidal shaped portion 9 and the second base portion 17 and are made of a material with high tensile strength such as an aromatic polyamide which is available under the trade name of KEVLAR®.

A circumferential hump 23 is disposed adjacent the juncture of the arcuate toroidal shaped and frusto conical portions 9 and 11 on the high pressure side thereof. The ribbons 19 extend from the arcuate toroidal shaped portion 9 adjacent the hump 23.

As shown in FIG. 2, when the cylindrical surfaces 3 and 5 are eccentrically disposed, the pressure on the high pressure side of the seal exerts a force on a portion of the cylindrical surface 5, tending to move the cylindrical surface 5 to a concentric position within the cylindrical surface 3.

The large annular seal hereinbefore described advantageously provides a seal which easily deforms under pressure to form a tight seal but one which will not invert due to the ribbons which also distribute the load between the two base portions 7 and 17 in such a manner that the attachment between the base portions 7 and 17 and the cylindrical surface 3 are subjected to shear rather than bending moments; the latter would tend to peel the base portions from the cylindrical surfaces to which they are affixed and also provides a self-centering resulting force which tends to center the cylindrical surface 5 when it becomes eccentrically disposed.

What is claimed is:

1. A seal for a large annular opening between two generally cylindrical surfaces, said seal comprising:
    a first base portion in the form of a ring affixed to one of these cylindrical surfaces;
    an arcuate toroidal shaped portion extending from the first base portion in such a manner that a concave side thereof is disposed on a high pressure side of said seal;
    a second base portion in the form of a ring affixed to said one cylinder on the high pressure side of the first base portion; and
    ribbons of high strength material spaced on a predetermined circumferential pitch extending between said first and second base portions and embedded therein to form a compliant seal which will not invert and with substantial self-centering characteristics.

2. A seal as set forth in claim 1, wherein the ribbons are made of an aromatic polyamide.

3. A seal as set forth in claim 1, wherein the arcuate toroidal shaped portion has a lip portion angled radially inwardly and toward the high pressure side thereof.

4. A seal as set forth in claim 1, wherein the arcuate toroidal shaped portion extends from the central portion of the first base portion.

5. A seal as set forth in claim 3, wherein the lip portion is frusto conically shaped.

6. A seal as set forth in claim 5 and further comprising a circumferential hump disposed at the juncture of the arcuate toroidal portion and the frusto conical lip portion on the high pressure side thereof.

* * * * *